United States Patent [19]

Hesh et al.

[11] Patent Number: 4,534,574
[45] Date of Patent: Aug. 13, 1985

[54] LIGHTWEIGHT CHUCK FOR WOODTURNING LATHE

[76] Inventors: Frank Hesh, 1155 W. Ogden; Edward F. Groh, 850 Hillside Rd., both of, Naperville, Ill. 60540

[21] Appl. No.: 537,117

[22] Filed: Sep. 29, 1983

[51] Int. Cl.³ .............................................. B23B 31/36
[52] U.S. Cl. ...................... 279/112; 279/67
[58] Field of Search ................. 279/112, 67; 142/1 R, 142/48, 55, 57; 82/40 R, 40 A, 41, 42, DIG. 6; 269/286

[56] References Cited

U.S. PATENT DOCUMENTS

| | | | |
|---|---|---|---|
| 785,584 | 3/1905 | Mowat | 279/112 |
| 803,984 | 11/1905 | Briggs | 279/112 |
| 960,705 | 6/1910 | Reynolds | 279/112 |
| 1,025,784 | 5/1912 | Clark | 279/112 |
| 1,424,597 | 8/1922 | Sloan | 279/112 |
| 2,177,326 | 10/1939 | Morris | 279/112 |
| 4,192,521 | 3/1980 | Smith | 279/112 |

*Primary Examiner*—William R. Briggs
*Assistant Examiner*—Glenn L. Webb
*Attorney, Agent, or Firm*—Charles F. Lind

[57] ABSTRACT

The disclosed chuck has a cylindrical body and a mounting hub secured thereto for concentrically connecting the body to the powered spindle of a lightweight woodturning lathe. The body has a faceplate opposite the mounting hub, and radial grooves are formed in the body from the faceplate. Adjustment screws fit in the grooves, being rotatably held therein by spaced bearings, and chuck jaws are supported on the rotatable adjustment screws and project forwardly from the faceplate. Rotation of each adjustment screw thus moves the chuck jaw thereon radially of the faceplate and within the grooves to provide keyed gripping of a workpiece to be shaped by the lathe. The workpiece can be of virtually any cross section as each jaw can be independently adjusted. The chuck body is approximately 10 inches in diameter and 1 inch in thickness and is formed of wood to be light in weight, only approximately 3 pounds.

8 Claims, 7 Drawing Figures

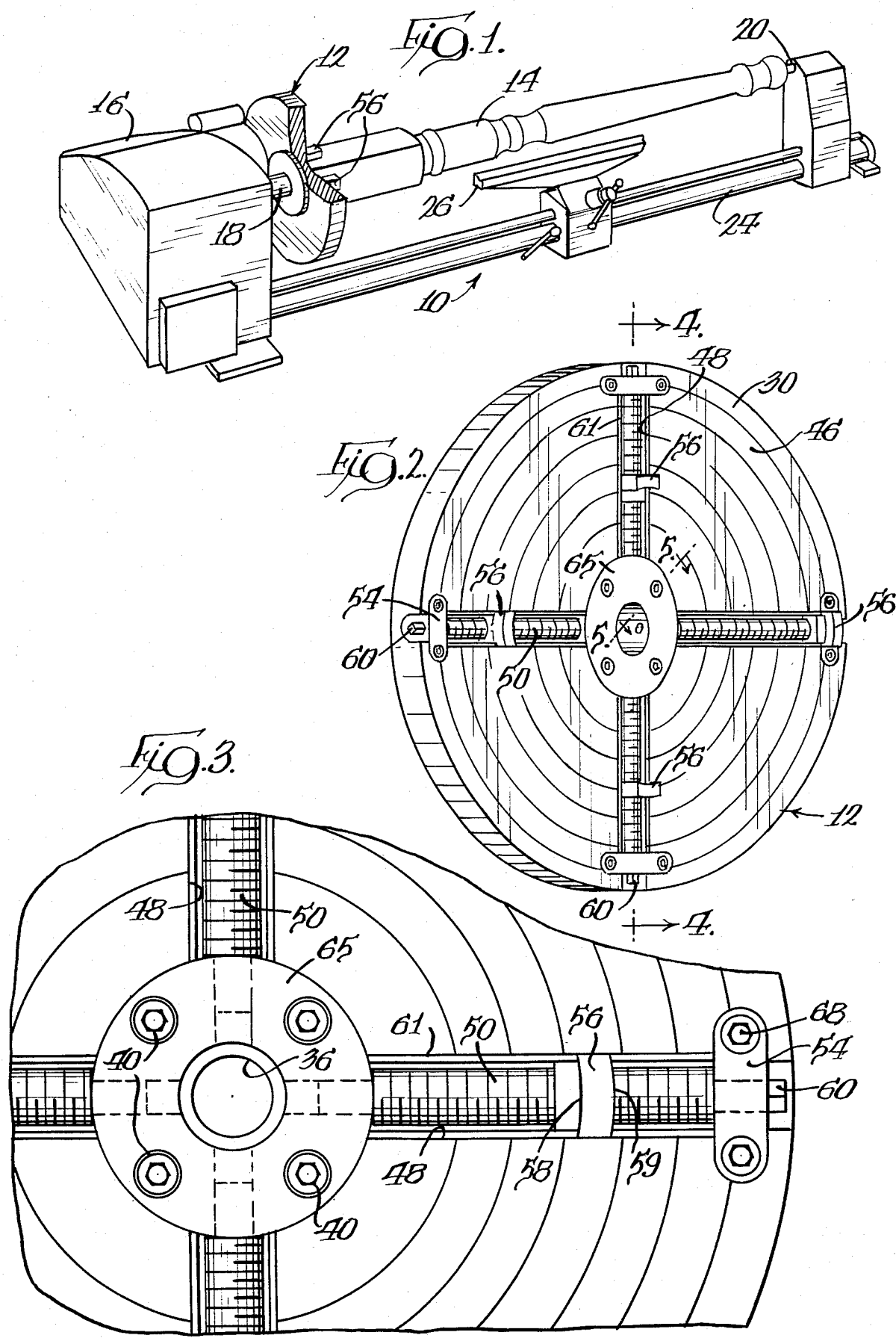

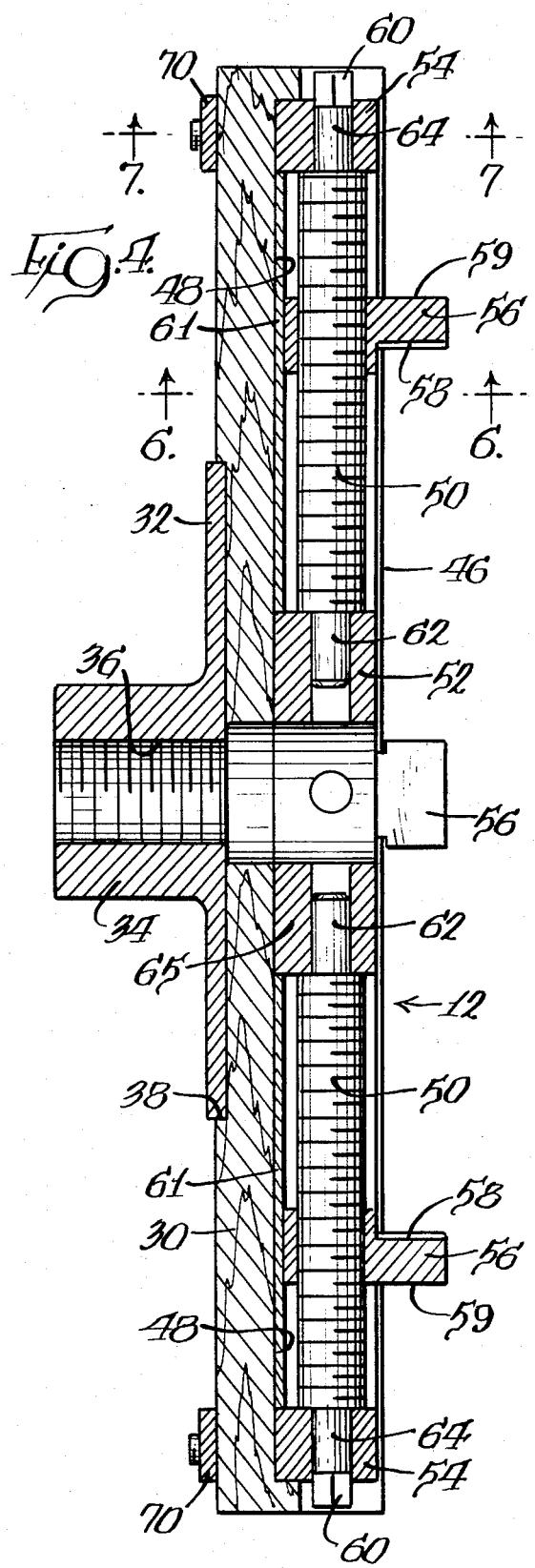
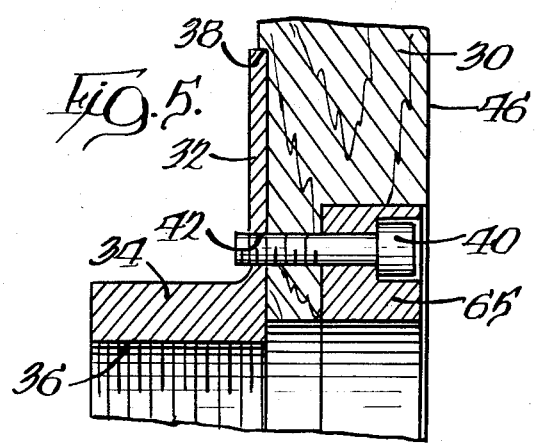
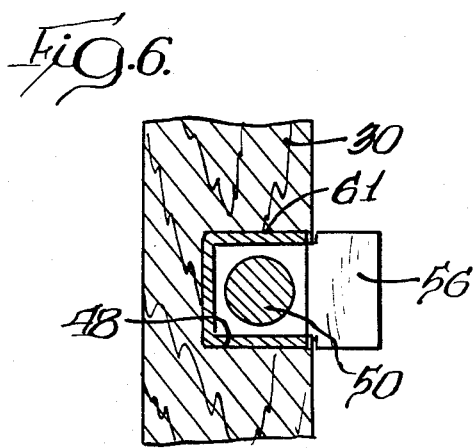
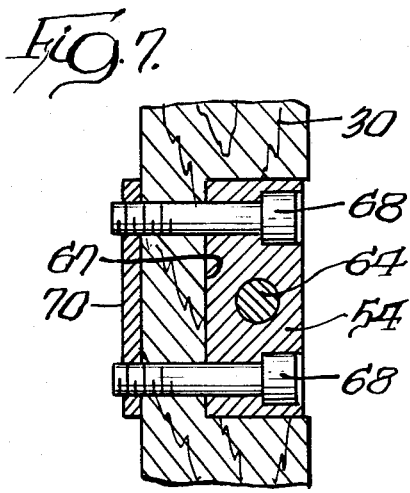

LIGHTWEIGHT CHUCK FOR WOODTURNING LATHE

BACKGROUND OF THE INVENTION

Woodturning lathes are commonly used for shaping wooden objects or workpieces according to patterns symmetrically disposed about the longitudinal center axis of the workpiece. The basic woodturning lathe includes spaced head and tail pieces designed to be adjusted toward one another and against the workpiece, the head and tail pieces being rotated then about an axis extended through the workpiece. A tool support provided adjacent the workpiece serves to steady a tool element which can be moved radially toward the rotating workpiece and axially along the length of the workpiece. Rotation of the workpiece accompanied by proper tool location thereby removes material for shaping the workpiece according to the required pattern.

The workpiece is commonly fixtured between the head and tail pieces by securement to a faceplate, which is in turn keyed to a rotating drive shaft or spindle. In many applications, the faceplate is flat and several screws fit through openings in the faceplate and are tapped directly into the end face of the workpiece. This means that after the workpiece has been shaped and removed from the lathe, the screwholes must be filled and the end face sanded. This is time consuming on the one hand and frustrating on the other, having scars on the workpiece even though extreme care and skill might have otherwise been exhibited in shaping the workpiece. Alternatively, a blank having a shape complementary to the intended workpiece might be formed of a durable service wood for holding the workpiece; however this requires very elaborate cutting and forming of the blank itself.

While metal lathes have more universally used chucks with movable jaws for holding a workpiece relative to the cutting member, chucks have not been universally used in wood lathes. One reason might be because of its added cost with its moving parts. Another reason might be because of its prohibited weight to be supported on the powered spindle. In this regard, the lathe typically has the drive shaft or spindle journalled from the powerhead in a cantilevered fashion toward the tail piece. The bearings for supporting such a spindle have in the past been marginal, particularly on a lower cost wood lathe of a domestic use quality, and have proved inadequate for supporting a conventional chuck on the spindle.

Several patents illustrating conventional chuck constructions include the Mowat U.S. Pat. No. 785,564 and the Reynolds U.S. Pat. No. 960,705 which provide a main faceplate structure and movable jaws adjustably mounted relative to the faceplate on adjustment screws. The Clark U.S. Pat. No. 1,025,784 further allows rotational adjustment of each chuck jaw about an axis parallel to the spindle itself. The Sloan U.S. Pat. No. 1,424,597 illustrates a support screw mounting for the chuck jaws adjustment screw. The Smart U.S. Pat. No. 1,535,183 and the Morris U.S. Pat. No. 2,177,326 each illustrates support bearings or retaining rings for holding the adjustment screws in place relative to the face plate.

Despite these many varied chuck constructions, none is suitable for use on woodworking lathes of average domestic use quality. Accordingly, all of the convenience and otherwise beneficial aspects for removably chuck-holding the workpiece relative to the powered rotating spindle are not available.

SUMMARY OF THE INVENTION

This invention relates to an improved construction for a chuck suitable for use on a woodturning lathe of conventional domestic quality, although of course it could be used on professional level woodworking lathes as well.

A basic object of this invention is to provide a chuck construction that is sufficiently lightweight so as to be capable of being mounted on a conventional spindle of a domestic quality woodworking lathe, while not causing damage to the lathe because of overloading the bearings or the like for the powered spindle, for allowing the adjustable and removable end support of the workpiece relative to the powered spindle.

A basic feature of this invention is a chuck construction having a hub for securement to the spindle and having a lightweight body or faceplate structure secured to the hub and having jaws and adjustment screws mounted relative to the faceplate, the composite of course being sufficiently lightweight to be usable on domestic quality woodworking lathe.

BRIEF DESCRIPTION OF THE DRAWINGS

FIG. 1 is a perspective view of a conventional domestic quality woodworking lathe showing a preferred embodiment of the subject chuck construction mounted on the powered spindle and further showing a workpiece mounted in place between the inventive chuck and the tailpiece.

FIG. 2 is a perspective view of the chuck illustrated in FIG. 1, as seen from the workpiece side of the chuck;

FIG. 3 is an enlarged view of the workpiece side of the chuck illustrated in FIG. 2;

FIGS. 4 and 5 are sectional views as seen respectively from lines 4—4 and 5—5 in FIG. 2; and FIGS. 6 and 7 are sectional views as seen respectively from lines 6—6 and 7—7 in FIG. 4.

DETAILED DESCRIPTION OF THE INVENTION

FIG. 1 illustrates in schematic a lathe 10 on which the inventive chuck 12 is mounted for releasably securing a workpiece 14. Specifically, the lathe includes a power head 16 wherein a motor (not shown) is mounted and from which a powered spindle 18 projects in a cantilevered manner. The chuck 12 is keyed to the spindle 18 so as to rotate therewith about the rotational center axis of the chuck 12. A tail piece 20 is located opposite the chuck 12 mounted to slide along slide bar 24 until it is properly spaced from the chuck 12 whereby the workpiece 14 can be fitted snugly and keyed between the two units. A tool support frame 26 likewise is adjustably secured on the slide bar 24 so that a cutting tool (not shown) can be rested thereon and moved axially and laterally of the workpiece 14 for shaping the workpiece as desired.

The chuck 12 (illustrated in greater detail in FIGS. 2, 3 and 4) has a lightweight body 30 mounted to flange section 32 of a mounting hub 34. The hub 34 has a threaded opening 36 adapted to be screwed onto the threaded end of the driven spindle 18. The rearsurface of the body 30 is countersunk as at 38 to allow the flange to fit snugly in place and bolts 40 (FIG. 5) are extended through openings in the body and threaded into taps 42 on the hub flange 32 for providing body securement on the hub.

The body 30 itself is cylindrical in shape having a generally flat faceplate 46 interrupted by four grooves or cutouts 48 within which adjustment screws 50 are rotatably supported at their opposite ends by bearings 52 and 54. Thus, the screws 50 can be rotated about axes extended radially of the body hub 34. A jaw 56 is mounted on each screw 50 and projects forwardly of the face plate 46, the jaw having inside and outside gripping faces 58 and 59, respectively. The outboard end 60 of each screw has a hex configuration to allow a conventional socket tool (not shown) to be interlocked therewith to turn the screw and drive the jaw 56 radially inward or outward relative to the face plate 56. Thus, the chuck jaws can be snugged against the inside or outside edge of the workpiece to hold the workpiece as desired.

The body 30 is formed of a durable but relatively lightweight material, such as a plastic or wood and preferably is fabricated to a diameter of perhaps 10 inches. In the illustrated embodiment, the groove 48 is lined with a U-shaped metal channel piece 61 (FIG. 6) and the jaw 56 fits in the channel piece 61 and thereby is non-rotatably keyed to slide within the channel piece upon rotation of the screw 50. The screws 50 are turned down to cylindrical shaft configurations 62 and 64 which in turn are fitted within the supporting bearing sections 52 and 54 carried near the center and outboard edges of the body 30. The inner bearings 52 are formed on a unitary ring 65 held in place by the bolts 40 threaded into the taps 42 on the hub flange 32; while each outer bearing 54 is each formed individually and is held in place in a cut out notch 67 (FIG. 7) in the body 30 by bolts 68 threaded into a backing piece 70.

Each adjustment screw 50 is preferably formed with a left hand thread so that the typical clockwise rotation of the screw looking in from its outward end by means of the socket tool (not shown) will cause its jaw 56 to move inward in a tightening fashion onto the outer edge of the workpiece; and vice-versa. The screws 50 themselves are fabricated of a durable material, such as steel. The bearings 52 and 54 similarly are formed of durable material such as plastic or metal. The jaws 56 are fabricated of steel. The end result is that the chuck 12 is dimensionally and mechanically sound having the jaws 56 that can be adjusted relative to one another independently and further that can be snugged up against the workpiece 14 for securement of the workpiece.

One most important aspect of this invention is that the entire chuck assembly 12 is fabricated of relatively lightweight materials. This thereby reduces its weight and allows for the cantilevered support of the chuck 12 from the free end of the drive spindle 18, without causing damage by excess imposed loads on the end of the spindle. In the particular disclosure, the main body 30 of the chuck 12 is fabricated of hard wood, like maple, and thereby does not generate merely by its large size a massive weight which will add to the weight of the chuck. Further, the various adjustment screws 50, bearings 52, 54 and jaws 56 and the hub 34 are each secured in place by means of securement bolts 40, 68 which are held in place relative to the appropriately threaded taps in the metal mounting flange 32 or backing piece 70. Likewise the sliding jaws 56 are guided within the channel guides 61 made of a lightweight and durable material for yet providing a chuck of overall lightweight. Of extreme importance therefore is the possible use of the lightweight chuck 12 on the powered spindle 18 on a wood turning lathe 10 where the workpiece 14 can be removably secured relative to the chuck 12 in a more conventional fashion. The workpiece therefore need not have the ends drilled for securing screws as was required in conventional fixturing means for domestic quality lathes. The jaws 56 are capable of being independently moved inward and outward relative to the workface 46 for allowing securement of the workpiece 14. The chuck body 30 need only be about ¾ to 1¼ inches thick for a diameter of perhaps 10 inches.

What is claimed is:

1. A lightweight chuck for use on a woodturning lathe, comprising a generally cylindrical chuck body forming a faceplate,
    said chuck body being formed of a lightweight rigid structural material,
    said body having radial grooves formed therein open from the faceplate and having a central cutout inboardly from the grooves and notched cutouts outboardly from the grooves also open from the faceplate,
an adjustment screw adapted to fit in each of the grooves,
inboard and outboard bearings for rotatably holding one of the adjustment screws in each of the grooves,
    said inboard bearings all being fitted in the central cutout from the faceplate side of the chuck body,
    said outboard bearings each being fitted in one of the respective outboard notched cutouts from the faceplate side of the chuck body, the notched cutouts defining abutments that serve to radially position the outboard bearings,
an elongated U-shaped channel guide fitted in each of the radial grooves with its open side open to the faceplate,
    each U-shaped guide extending at its opposite ends to butt against the inboard and outboard bearings disposed in the groove,
a chuck jaw for each of the grooves and having a threaded bore adapted to be threaded onto the adjustment screw disposed therein,
    said chuck jaw being shaped and sized to be fitted in the grooves from the faceplate side of the chuck body and be nonrotatably received in and keyed relative to the U-shaped channel guide and projecting forwardly of the open side thereof and beyond the faceplate, and being operable to slide along and within the channel guide upon rotation of the adjustment screw,
a mounting hub adapted to be secured to the lathe for powered rotation, and
means for securing the chuck body to the hub,
    said securing means including locating the hub on the side of the chuck body remotely of the faceplate and bolt means extended from the faceplate side of the chuck body through openings in the chuck body and openings in the inboard bearings and threaded into taps in the mounting hub, operable also then to hold both the inboard bearings and hub relative to the chuck body.

2. A lightweight chuck for a woodturning lathe, according to claim 1, wherein the chuck body is formed of wood.

3. A lightweight chuck for a woodturning lathe, according to claim 2, wherein the chuck body is formed of hard maple.

4. A lightweight chuck for a woodturning lathe, according to claim 2, wherein the chuck body is of the order of 10 inches in diameter and 1 inch in thickness.

5. A lightweight chuck for a woodturning lathe, according to claim 1, wherein the U-shaped channel guides are formed of metal.

6. A lightweight chuck for a woodturning lathe, according to claim 5, further comprising means for mounting the outboard bearings to the chuck body and including a backing piece located on the side of the chuck body remotely of the faceplate and bolt means extended from the faceplate side of the chuck body through openings in the chuck body and each outboard bearing and threaded into taps in the backing piece.

7. A lightweight chuck for a woodturning lathe, according to claim 6, wherein the chuck body is of the order of 10 inches in diameter and 1 inch in thickness.

8. A lightweight chuck for a woodturning lathe, according to claim 7, wherein the chuck body is formed of hard maple.

* * * * *